United States Patent

Yamashita et al.

[15] 3,690,228
[45] Sept. 12, 1972

[54] SHUTTER RELEASE DEVICE FOR AUTOMATIC EXPOSURE CAMERA

[72] Inventors: Maki Yamashita, Osaka; Haruo Kobayashi, Sakai, both of Japan

[73] Assignee: Minolta Camera Kabushiki Kaish, Osaka, Japan

[22] Filed: March 24, 1970

[21] Appl. No.: 22,216

[30] Foreign Application Priority Data

March 26, 1969 Japan ..................... 44/22969

[52] U.S. Cl. ................................. 95/10 C, 95/64 R
[51] Int. Cl. ............................................. G03b 7/12
[58] Field of Search ................. 95/64 D, 10 C, 64 R

[56] References Cited

UNITED STATES PATENTS 3,464,333   9/1969   Aoki et al. .................. 95/10 C
3,106,882  10/1963   Maitani ....................... 95/10 C Primary Examiner—Samuel S. Matthews
Assistant Examiner—Russell E. Adams, Jr.
Attorney—Watson, Cole, Grindle & Watson

[57] ABSTRACT

A shutter release device for an automatic exposure camera in which a shutter release member is interlocked with a restraining member provided for a shutter driving member. Such inter-locking is effected through an interlocking member. The amount of displacement of an exposure meter pointer detecting member, in the first stage of the release operation, maintains or interrupts the interlocking of the interlocking member for the shutter release member and the restraining member for the shutter driving member, in accordance with whether the pointer is located in or out of the automatic exposure range.

3 Claims, 5 Drawing Figures

INVENTOR
Maki Yamashita
Haruo Kobayashi
BY
Watson, Cole, Grindle & Watson
ATTORNEY

SHUTTER RELEASE DEVICE FOR AUTOMATIC EXPOSURE CAMERA

In the prior art, cameras have been designed for automatically setting the exposure by scanning the position of the pointer of an exposure meter. When proper exposure could not be obtained because of too much or too little light, the prior art cameras used two arrangements to warn the camera user. The cameras were either arranged to lock the shutter release to prevent downward movement of the release member, or the cameras displayed an indication in the viewfinder during the first stage of the release operation. However, these two solutions were undesirable. The use of a release lock increased the chance of camera damage through undo pressure being applied to the release member by the camera user. The use of an indication was not a positive means of preventing camera actuation.

SUMMARY OF THE INVENTION

The present invention relates to a shutter release device in an automatic exposure camera. A shutter release member is normally connected to the shutter restraining member of a shutter driving member by way of an interlocking member. During the first stage of release operation, the position of the pointer of an exposure meter is detected. If the pointer is located outside the automatic exposure range, the interlocking member is disconnected from the release member and restraining member. As a result, the shutter release member can not actuate the camera shutter even though still able to be depressed.

The primary object of the present invention is to provide a shutter release set-up device in an automatic exposure camera, which breaks the interlocking of a shutter release member and a restraining member for a shutter driving member when the pointer of the exposure meter is out of the automatic exposure pre-set range.

The second object of the present invention is to provide a shutter release device in an automatic exposure camera, which is so constructed that, whether the pointer of exposure meter is in or out of the automatic exposure range, a shutter release member can make a given movement when operated. Also, when the pointer of the exposure meter is out of the automatic exposure range, the interlocking of the shutter release member with a restraining member for a shutter driving member is broken and the shutter driving member is held in the inoperative position by the restraining member.

Another object of the present invention is to provide such a shutter release device wherein the difference of the displacement quantity of the pointer detecting member controls the movement of an interlocking member. Such is effected by giving variety to the displacement quantity of an exposure meter pointer detecting member in accordance with whether the pointer is located in or out of the automatic exposure range during the first stage of the release operation. This difference in the displacement quantity also serves to interlock the shutter release member with the restraining member for the shutter driving member to the position for interlocking or to the position for breaking the interlocking effect.

Another object of the present invention is to provide such a shutter release device, in which a pointer detecting member engages the pointer in the first stage of the release operation, when the pointer of the exposure meter is in the automatic exposure range. Also, when the pointer of the exposure meter is out of the automatic exposure range, said pointer allows said pointer detecting member to move past the pointer. Said movement beyond said pointer breaks the interlocking effect of the interlocking member for interlocking the shutter release member and the restraining member for the shutter driving member.

Another object of the present invention is to provide a shutter release device in an automatic exposure camera, in which a warning member appears in the view finder indicating that the interlocking effect of the interlocking member for interlocking the shutter release member with the restraining member for the shutter driving member is broken.

DESCRIPTION OF THE PREFERRED EMBODIMENT

Figure 1:
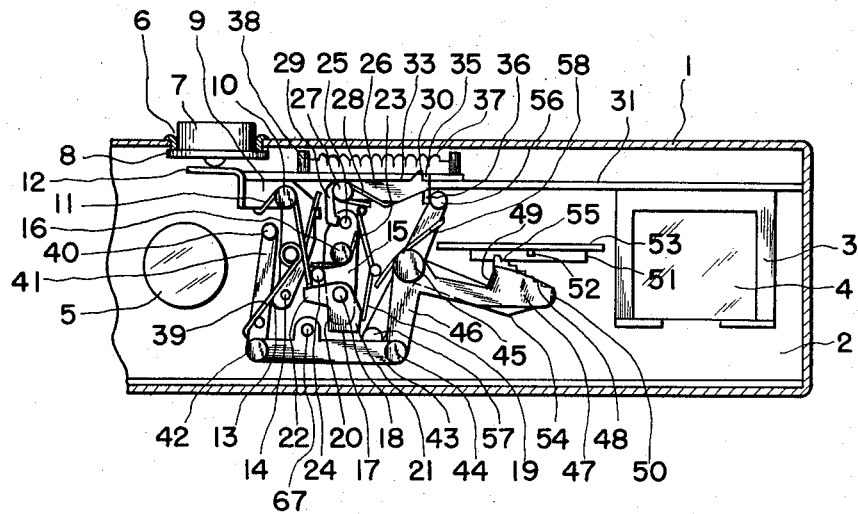
FIG. 1 is a sectional front view of an embodiment in accordance with the present invention.
Figure 2:
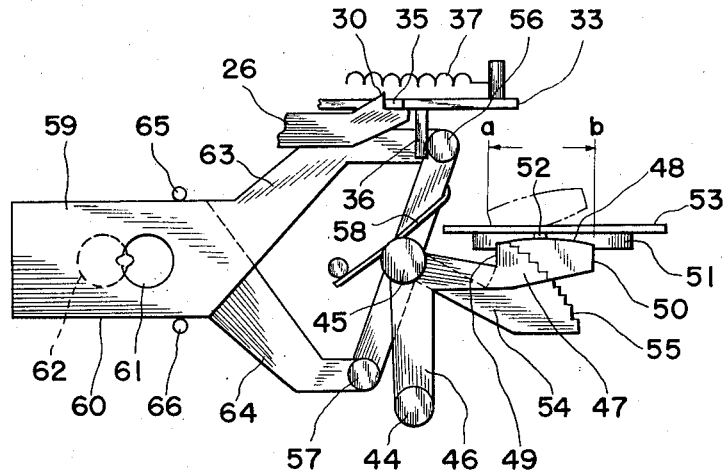
FIG. 2 is an enlarged partial front view of the embodiment shown in FIG. 1.
Figure 3:
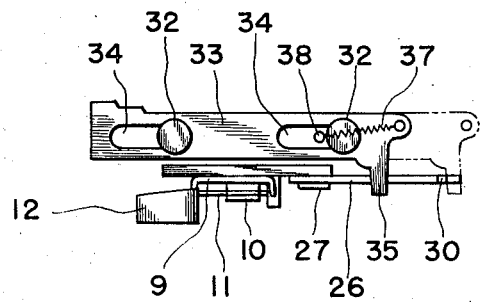
FIG. 3 is a top view of the shutter release member, and the shutter driving member and the restraining member therefor in the embodiment shown in FIG. 1.

FIGS. 1, 2 and 3 illustrate an embodiment of a camera in accordance with the present invention, wherein all parts which have no bearing on the present invention are omitted.

On intermediate frame plate 2 near the front of camera body 1 there are supported finder frame 3 for bearing the finder objective lens 4 and photographic lens 5, and on the upperside of the camera body 1 there is provided an opening 6 for a shutter release button 7.

L-shaped release lever 9 mounted on intermediate frame plate 2 by pin 10 is given a clockwise bias by spring 11, and one arm thereof, namely, bent piece 12, comes into contact with the underside of release button 7. The button is urged upward and is restrained by collar 8. On the other arm of said release lever 9 there is provided lug 13 with which the side edge of a working link lever 41 for the pointer detecting plate described hereinafter comes into contact, an interlocking pin 14 being fixed on said lug 13.

To the lower end of interlocking lever 15 mounted on intermediate frame plate 2 by pin 16, an L-shaped interlocking piece 17 is connected by pin 18 and given a clockwise bias by weak spring 19. A bent portion 21 formed on release arm 20 of said interlocking piece 17 comes into contact with the side edge of interlocking lever 15 to check its clockwise turning. Interlocking lever 15 is given a clockwise bias by strong spring 23 to come into contact with pin 24. The arm 22 of the interlocking piece 17 faces toward said interlocking pin 14 with a clearance therebetween. Pin 25, provided on the other arm of interlocking lever 15, faces toward one arm 29 of restraining lever 26. Restraining lever 26 is biased counter-clockwise through spring 28, and on the other arm of said restraining lever 26 a restraining pawl 30 is formed.

Sliding on supporting plate 31 and projecting horizontally from intermediate frame plate 2, there is provided a shutter driving plate 33 having guide slots 34 guided on pins 32 fixed on said supporting plate 31 as shown in FIG. 3. Shutter driving plate 33 is provided with driving spring 37 connected between pin 38, projecting from supporting plate 31, and shutter driving plate 33. The plate 33 is urged to the left by said spring 37 and on the right end thereof there are provided restraining protrusion 35 for engaging with said pawl 30 of restraining lever 26 and working pin 36 projected downwardly of said restraining protrusion 35.

Link 41 connected to intermediate frame plate 2 by pin 40 and given a clockwise bias through spring 39 is coupled with link 43 by connection pin 42. Said link 43 is connected by pin 44 to the coupling arm of pointer detecting lever 46 connected to intermediate frame plate 2 by pin 45. On the other arm of lever 46 a pointer detecting plate 47 is formed.

In intermediate frame plate 2 a long slot 51 is provided, and in FIG. 1 ammeter pointer 52 supported on the back side of intermediate frame plate 2 projects through said long slot 51 and moves to the right and left in accordance with the electric current value registered by the ammeter.

A lip portion 53 formed along the upper edge of said long slot 51 serves as a backup support for pointer 52 when said pointer 52 is being restrained by pointer detecting plate 47.

When pointer 52 is in the automatic exposure range a-b as shown in FIG. 2, arresting face 48 of said pointer detecting plate 47 can contact and restrain said pointer 52. Faces 49, 50 meet at right angles with said arresting face 48 on both ends of plate 47, and when pointer 52 is out of the automatic exposure pre-set range a-b, said pointer detecting plate 47 can turn beyond lip 53 without pressing the pointer.

On pin 45, fixed on said intermediate frame plate 2, pointer scanning lever 54 is rotatably mounted under pointer detecting lever 46, and on one arm of said pointer scanning lever 54 there is formed scanning face 55 which scans the position of the pointer when the latter is restrained by pointer restraining face 48. Face 55 is formed into the stepped shape shown for scanning the position of the pointer, and on the ends of the other arm of said pointer scanning lever 54 pins 56 and 57 are respectively formed and given a counter-clockwise bias by spring 58, said pin 56 being restrained by engaging with working pin 36 fixed on shutter driving plate 33. With said pins 56 and 57 there are respectively coupled in the link form working arms 63, 64 of two diaphragm plates 59, 60 guided by pins 65, 66 fixed on intermediate frame plate 2. In said diaphragm plates 59, 60 diaphragm holes 61, 62 are provided, and these holes 61, 62 are formed so as to register partially or completely, with each other with photograph lens 5 as a center.

A release pin 67 is fixed on coupling link 43, and when pointer 52 is out of the automatic exposure range a-b and pointer detecting plate 47 turns to the position shown by a chain line in FIG. 2 without engaging with the pointer, the displacement of said link 43 to the right causes release pin 67 to contact with release arm 20 of interlocking piece 17 connected by a pin to interlocking lever 15, to turn said interlocking piece 17 counter-clockwise against spring 19 and retract driven arm 22 to a position cannot engage with interlocking pin 14.

As the present invention is described above, when by means of a charge lever not shown in the drawings or a well known mechanism interlocked with the film take-up operation, the shutter charge is effected, shutter driving plate 33 is moved to the right against spring 37 and restraining protrusion 35 engages restraining pawl 30 of restraining lever 26. At the same time, working pin 36 presses to move pin 56 so as to turn scanning lever 54 clockwise on pin 45 as a center and against spring 58, and scanning face 55 retracts from long slot 51 for the pointer to turn to the condition shown in FIG. 1.

In this state, when the camera is directed to an object, by action of the light sensitive element not shown in the drawings, pointer 52 of the exposure meter takes a position corresponding to the brightness of the object.

Provided that the brightness of an object is in the automatic exposure pre-set range and the pointer is in the automatic exposure pre-set range a-b shown in FIG. 2, by pressing down release button 7 release lever 9 is turned counter-clockwise and lever 41 also is turned counter-clockwise, and accordingly pointer detecting lever 46 turns counter-clockwise and pointer detecting plate 47 grips pointer 52 between pointer arresting face 48 thereof and lip 53 to prevent the turning of link 41 and accordingly the displacement of link 43 to the right is prevented. In this case, release pin 67 has not been engaged yet with release arm 20 of interlocking piece 17 so that said interlocking piece 17 holds the position shown in FIG. 1. By the subsequent turning of release lever 9, interlocking pin 14 comes into contact with driven arm 22 of interlocking piece 17 to turn interlocking lever 15 counter-clockwise through said interlocking piece 17 and against spring 23. Working pin 25 presses arm 29 of restraining lever 26 to turn it clockwise against spring 28. Restraining pawl 30 disengages from restraining protrusion 35 of shutter driving plate 33 and said shutter driving plate 33 is pulled to the left by spring 37. On account of said movement of shutter driving plate 33 to the left, working pin 36 is retracted from pin 56 so that scanning lever 54 turns counter-clockwise urged by spring 58 and stops when the stepped face of scanning face 55 engages with pointer 52. The turning of scanning lever 54 moves diaphragm plates 59, 60 to register diaphragm holes 61, 62 correspondingly to fix the diaphragm opening properly, and the movement of shutter driving plate 33 to the left opens the shutter.

However, if the pointer is not in the automatic exposure pre-set range, with the turning of release lever 9 caused by pressing down shutter button 7, lever 41 turns and arresting face 48 of pointer detecting plate 47 turns up to the position shown by a chain line in FIG. 2, passing the long slot 51 without engaging with pointer 52, and release pin 67 of link 43 engages with release arm 20 of interlocking piece 17 to turn it counter-clockwise against weak spring 19, and in the subsequent turning of release lever 9 the engagement of interlocking pin 14 and driven arm 22 is broken, therefore, even though release button 7 is pressed deeply, interlocking lever 15 is not turned and accordingly shutter driving plate 33 remains restrained by arresting pawl 30 and the shutter is not opened.

Figure 4:
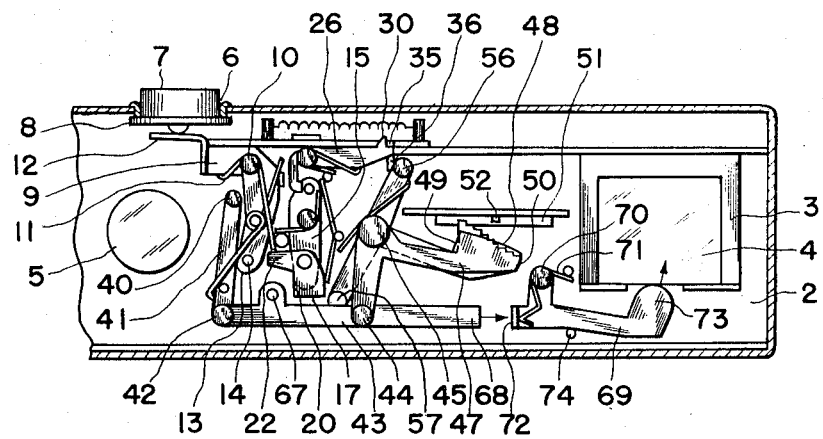
FIG. 4 is a sectional front view of another embodiment in accordance with the present invention.

In the embodiment shown in FIG. 4 when pointer 52 is out of the automatic exposure pre-set range *a–b* pointer arresting plate 47 turns to the position shown by a chain line in FIG. 2 and link 43 is displaced to the right, so that release pin 67 engages with release arm 20 of interlocking piece 17 to turn said interlocking piece 17 counter-clockwise and disengage interlocking pin 14 of release lever 9 from driven arm 22 of interlocking piece 17. This sequence is the same as in the first embodiment described above, however, said link 43 is extended to form projecting end 68 and there is provided a warning lever 69 mounted on intermediate frame plate 2 by pin 70 and given a clockwise turning tendency by spring 71 to come into contact with pin 74, and when said projecting end 68 is displaced to the right it engages with bent-up piece 72 provided on one end of said warning lever 69, and indicating piece 73 provided on the other end of said warning lever 69 is caused to move into finder 4, to warn the photographer that pointer 52 is located out of the automatic exposure pre-set range.

We claim:

1. A shutter release device for an automatic exposure camera, comprising:
    a manually operating member including a manually moving button and an interlocking lever movable with said button and having a pin mounted thereon;
    a shutter driving member;
    a locking member for locking said shutter driving member in a charged position, and preventing shutter opening operation;
    an ammeter having a pointer swingable in response to the brightness of an object to be photographed;
    an intermediate means interconnectable with said manually operating member for transmitting movement thereof to said locking member and releasing said locking member, said intermediate means including a releasing lever engaging with said locking member, and further including an intermediate lever movably mounted on said releasing lever and normally engageable with said pin, permitting said releasing lever to be moved by said interlocking lever through said intermediate member for releasing the locking member, said intermediate lever being so moved by said manually operating member as to be disengaged from said pin when said pointer is out of the automatic exposure range; and
    an operating member being biased to follow said manually operating member and having a pointer detecting means thereon for engaging and being stopped by said pointer when it is within the automatic exposure range and for operating on said intermediate member to break the interconnection of said manually operating member and said intermediate member when said pointer is out of the automatic range, said operating member including a follow-up lever connected to said interlocking lever by a spring, said detecting means including a detecting lever having a detecting end capable of being moved substantially perpendicularly to the path of said pointer and extending over the automatic exposure range thereof, said operating member further including an operating lever linked with said follow-up lever and said detecting lever for removing said intermediate lever from the path of said pin on said interlocking lever when said detecting end is moved beyond the path of said pointer.

2. A shutter release device for an automatic exposure camera as set forth in claim 1, further comprising:
    a diaphragm means for controlling the aperture of an objective lens; and
    a diaphragm controlling member being arranged for movement by said shutter driving member, and movable between the charged position, which is restrained by said shutter driving member when locked at the cocked position, and the controlling position to engage with said pointer which is engaged with said pointer detecting means for controlling said diaphragm means.

3. A shutter release device for an automatic exposure camera, as set forth in claim 2, wherein said shutter driving member is provided with a pin thereon, and said diaphragm controlling member is biased to engage with said driving member pin to move with said shutter driving member to engage with said pointer when the shutter driving member is released by said locking member from the charged position, and said shutter driving member releases a shutter member for initiating an exposure after said diaphragm controlling member engages with said pointer.

* * * * *